Oct. 11, 1927.
C. T. TAYLOR
1,645,360
FRUIT PICKER'S BAG
Filed Oct. 19, 1926
3 Sheets-Sheet 1
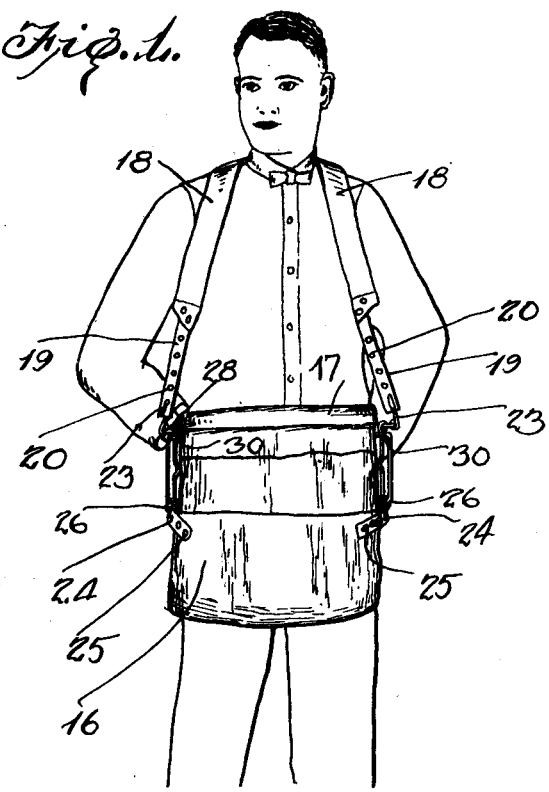
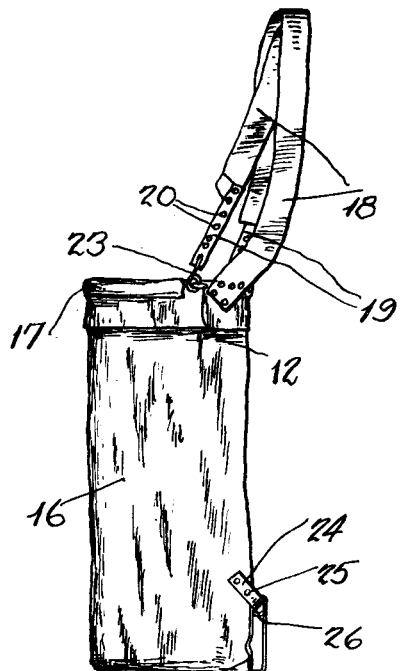
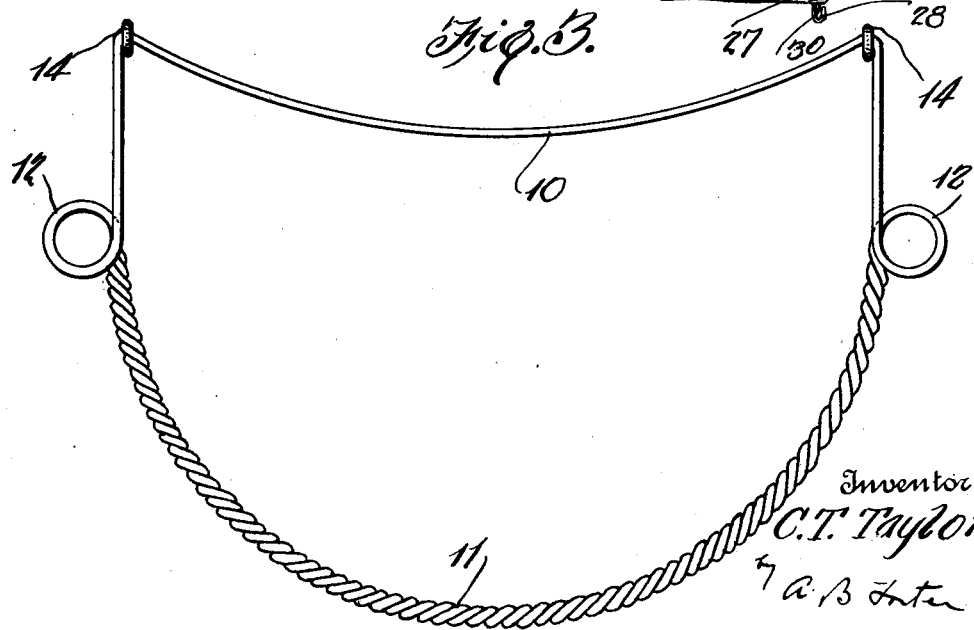
Inventor
C. T. Taylor.
Attorney Oct. 11, 1927.
C. T. TAYLOR
1,645,360
FRUIT PICKER'S BAG
Filed Oct. 19, 1926
3 Sheets-Sheet 2
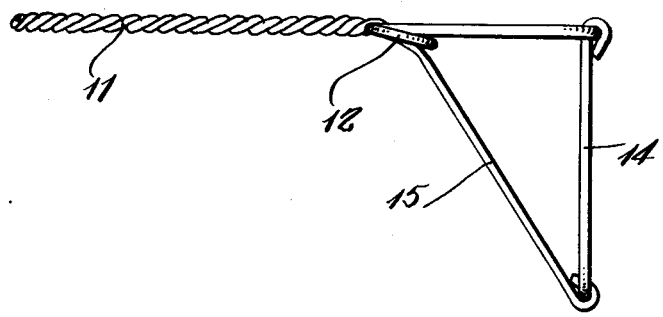
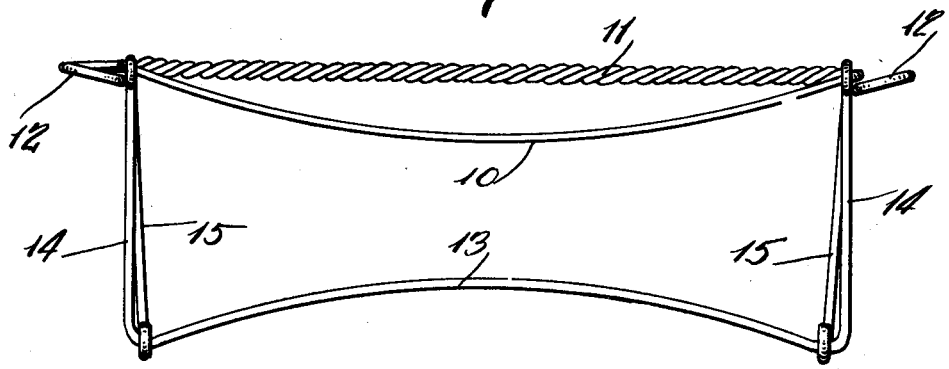
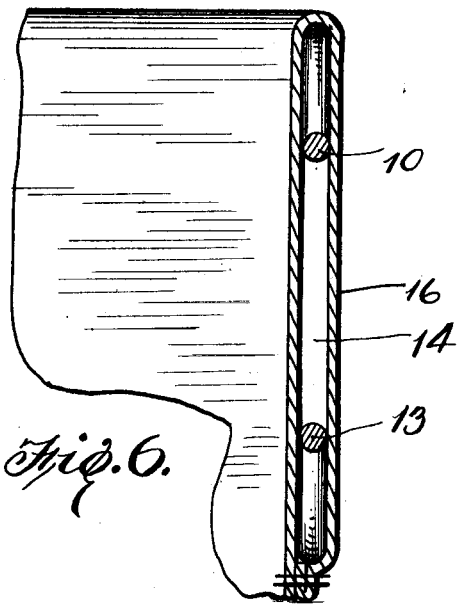
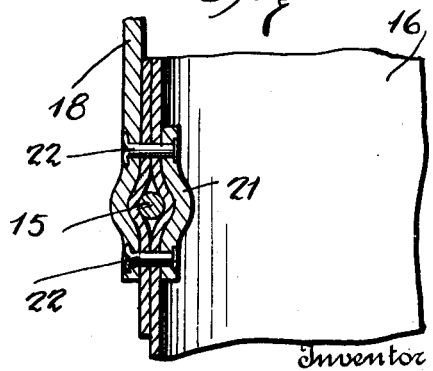
Inventor
C. T. Taylor
Attorney Oct. 11, 1927.  1,645,360
C. T. TAYLOR
FRUIT PICKER'S BAG
Filed Oct. 19, 1926   3 Sheets-Sheet 3
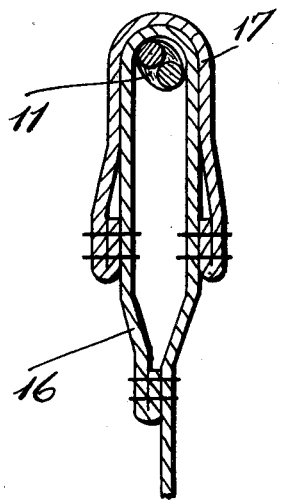
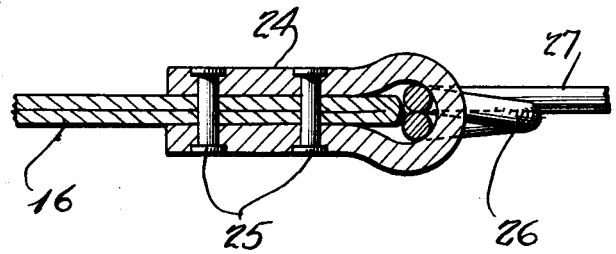
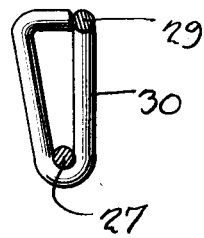
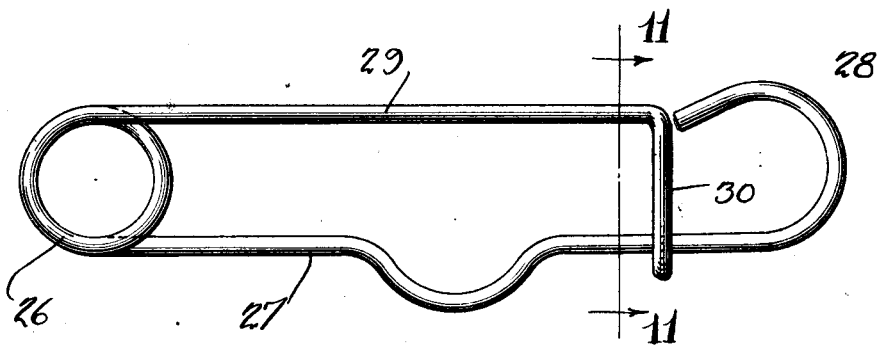

Patented Oct. 11, 1927.

1,645,360

UNITED STATES PATENT OFFICE.

CLARENCE T. TAYLOR, OF ARLINGTON, KANSAS.

FRUIT-PICKER'S BAG.

Application filed October 19, 1926. Serial No. 142,713.

This invention relates to bags such as are used by fruit pickers and vegetable gatherers especially for the larger types of fruit such as apples, pears, peaches and citrus fruits. In gathering such fruits for the market care must be taken that the fruits are not bruised in handling, either in placing them in the gathering receptacle or in dumping them from such receptacle.
One important object of the invention is to provide an improved general construction of receptacle of this class wherein special provision will be made for wearing the receptacle in such manner that fruit may be readily placed in it without dumping one piece of the fruit against the other, or allowing it to slide down a chute and come in violent contact with the fruit already in the receptacle.
A second important object of the invention is to provide improved means whereby the fruit may be dropped from the receptacle very gently so that it will not become bruised.
It it not new to provide receptacles of this class wherein the receptacle is in the form of a tube supported at its upper end from the body of the wearer and having its lower end folded up and secured during the fruit gathering operation, the lower end being dropped to permit dumping of the receptacle when desired. However, the present devices either involve more or less complication of arrangements or the supporting of the folded bottom is not taken directly on the straps which support the whole receptacle.

Another important object of the present invention is to provide an improved arrangement of this character wherein the receptacle will have a top frame to which the supporting straps are directly connected and also to which the means for maintaining the bottom in folded condition is connected.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a view showing the receptacle supported from the shoulders of a user and the bottom folded up.

Figure 2 is a side elevation of the receptacle in dumping position.

Figure 3 is a plan view of the receptacle frame with the cloth omitted.

Figure 4 is a side elevation of said receptacle frame.

Figure 5 is a rear view thereof.

Figure 6 is a vertical section through the upper part of the rear wall of the receptacle.

Figure 7 is a section showing the manner of securing the supporting straps to the frame.

Figure 8 is a vertical section through the upper part of the front wall of the receptacle.

Figure 9 is a section showing the manner of attaching the bottom hooks.

Figure 10 is a side elevation, to an enlarged scale, of one of the special hooks used herewith.

Figure 11 is a section on the line 11—11 of Figure 10.

In the present embodiment of the invention there is provided a frame, the upper part of which is formed from a single length of wire bowed at its middle to fit the waist portion of a user and extending forwardly to form a U-shaped front frame member, the rear member being indicated at 10 and the front at 11. The ends of the wire are twisted together to strengthen this front portion and adjacent the rear end of each leg of the U the wire is bent as at 12 to form an eye. The lower rear frame member is also formed from a single piece of wire having a middle arcuate part conforming to the wearer's body and upstanding legs 13 connected at their upper ends to the rear corners of the upper frame. Diagonal side braces 15 connect the lower ends of the legs 14 with the member 11 at the eyes 12.

The main portion of the receptacle itself consists of a tubular flexible body 16 having its upper part doubled over the frame from the inside outwardly and secured by suitable stitching. At the front of the frame there is provided a wear strip or cushion strip 17 which is doubled over the frame outside of the double part of the main portion and so arranged that six thicknesses of material are provided at this point. Just below each of the eyes 12 there is fixed one end of a supporting strap 18, the strap being preferably a wide fabric strap and provided with a leather end 19 having spaced holes 20 therein. Inside of the receptacle there is provided a leather washer 21 and rivets pass through the receptacle wall, the washer and the strap end as at 22. It will be noted that these rivets are arranged on opposite sides of the respective braces 15 so that the weight of the receptacle and its contents is taken on the braces and not on the material of this receptacle. Engaging each of the eyes 12 is the eye end of a hook 23, the bill of which is selectively engageable in the openings or holes 20. Obviously, by this means, the supporting straps may be adjusted to suit the wearer and, if preferred, may be passed around the waist instead of over the shoulders as shown in Figure 1.

At each side of the lower open end of the receptacle there is provided a leather U-shaped strap 24 which has its legs embracing a fold of double thickness of the receptacle wall and secured by the rivets 25. Special hooks are used to hold the lower end of the receptacle in upturned position and also to constitute handles for the wearer to grip in lowering this end to dump the receptacle. Each of these hooks consist of a single length of spring wire bent to provide a coil 26 from which one end portion of the wire extends as at 27 to form the back of the hook, the terminal part of this end portion constituting a hook bill 28. The remaining end of this wire extends substantially parallel to the back to form a front part 29 and terminates in a guard loop 30 surrounding the back and normally closing the opening of the portion 28. Thus these hooks can be engaged and disengaged with the eyes and the weight of the bottom receptacle and its contents is taken directly on these eyes so that the whole bag is nowheres supported on a single thickness of the bag material.

In use the large hooks are engaged in the eyes and the bag filled with the fruit or vegetables being picked. The wearer then walks to the place of deposit, unhooks the large hooks and, holding them in his hands, lowers the bottom end of the bag so that the fruit or vegetables roll gently out of the device.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a fruit picker's bag, a flexible tubular receptacle having open upper and lower ends, a wire frame to which the upper end is secured and comprising a horizontally disposed U-shaped front member having rearwardly extending legs and an arcuate rear member connecting the rear ends of the legs of the front member and forwardly bowed to fit the waist of a user, said forward frame member being provided with eyes adjacent the rear ends of its legs, the forward frame member forward of the eyes being formed of the end portions of the wire twisted together to stiffen this portion of the frame, supporting straps each having one end fixed to a side of the receptacle close below the rear ends of the U-shaped frame member, said straps having their free ends provided with a series of spaced holes, and hooks connected to said eyes for free movement and engageable selectively in the holes of said straps.

2. In a fruit picker's bag, a flexible tubular receptacle having open upper and lower ends, a wire frame to which the upper end is secured and comprising a horizontally disposed U-shaped front member having rearwardly extending legs and an arcuate rear member connecting the rear ends of the legs of the front member and forwardly bowed to fit the waist of a user, said forward frame member being provided with eyes adjacent the rear ends of its legs, the forward frame member forward of the eyes being formed of the end portions of the wire twisted together to stiffen this portion of the frame, supporting straps each having one end fixed to a side of the receptacle close below the rear ends of the U-shaped frame member, said straps having their free ends provided with a series of spaced holes, hooks connected to said eyes for free movement and engageable selectively in the holes of said straps, U-shaped straps gripping the sides of the lower part of the receptacle, and spring hooks having bight portions engaged by the U-shaped straps and bill portions engageable with and disengageable from said eyes.

3. In a fruit picker's bag, a flexible tubular receptacle having open upper and lower ends, a frame to which the upper end is secured and comprising a horizontally disposed U-shaped front member having rearwardly extending legs and an arcuate rear member connecting the rear ends of the legs of the front member and forwardly bowed to fit the waist of a user, a second arcuate member forming a bottom rear frame member spaced below the first rear frame member and having upstanding legs connected thereto, said forward frame member being provided with eyes adjacent the rear ends of its legs, supporting straps each having one end fixed to a side of the receptacle close below the rear ends of the U-shaped frame member, said straps having their free ends provided with a series of spaced holes, hooks connected to said eyes for free movement and engageable selectively in the holes of said straps, and diagonal braces connecting the front frame member to the bottom rear frame member and carrying the fixed ends of the supporting straps.

In testimony whereof I affix my signature.

CLARENCE T. TAYLOR.